United States Patent
Roe et al.

(10) Patent No.: US 6,314,131 B1
(45) Date of Patent: Nov. 6, 2001

(54) METHOD AND SYSTEM FOR CHANNEL ESTIMATION USING MULTI-SLOT AVERAGED INTERPOLATION

(75) Inventors: Sooyeon Roe, Sunnyvale; Khalid A. Qaraq'e, Santa Clara, both of CA (US)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 09/534,940

(22) Filed: Mar. 24, 2000

(51) Int. Cl.$^7$ ................................................ H04B 17/00
(52) U.S. Cl. ...................... 375/227; 370/347; 370/342; 375/130
(58) Field of Search ..................... 375/130, 227, 375/346, 349; 370/321, 337, 347, 442, 335, 342, 441

(56) References Cited

U.S. PATENT DOCUMENTS 5,862,156 * 1/1999 Huszar et al. ..................... 375/262
5,862,192 * 1/1999 Huszar et al. ..................... 375/347
5,982,761 * 11/1999 Dutta ..................................... 370/337

* cited by examiner

*Primary Examiner*—Don N. Vo
(74) *Attorney, Agent, or Firm*—Crosby, Heafy, Roach & May (57) ABSTRACT

A method of Multi-slot Averaged Linear Interpolation (MALI) to estimate channel transfer characteristics at a receiver in a wireless network. The method and system are particularly well suited to use in wideband CDMA transmission systems. The steps of the method include calculating an instantaneous channel estimation from each slot in a transmitted signal, combining the instantaneous channel estimations for adjacent slot groups, and linearly interpolating between multi-slot averages to provide each symbol within a slot an accurate estimate of transfer characteristics for that symbol.

16 Claims, 5 Drawing Sheets

METHOD AND SYSTEM FOR CHANNEL ESTIMATION USING MULTI-SLOT AVERAGED INTERPOLATION

BACKGROUND OF THE INVENTION

1. Field of the Invention

The present invention relates generally to the field of telecommunications, and more particularly to the field of wireless communications.

2. Discussion of the Background Art

Wireless communication systems are commonly employed to provide voice and data communications to a plurality of mobile units or subscribers. Since 1991, the availability of TDMA (Time Division Multiple Access) digital cellular and Personal Communication Systems (PCS) technologies has led to wide adoption of wireless communications. In 1995, Code Division Multiple Access (CDMA) technology was introduced and is now used in PCS and cellular systems as well. Most recently, great interest and effort has been focussed on deploying a Wideband CDMA (W-CDMA) system in the wireless communication market. The most recent effort at standardizing W-CDMA resulted in the IMT-2000 standard, to be deployed by year 2002 to 2004, as discussed in Tero Ojanpera and Ramjee Prasad, *Wideband CDMA for Third Generation Mobile Communications,* Artech House, 1998, and Jong Sam Lee and Leonard E. Miller, *CDMA Systems Engineering Handbook,* Artech House, 1998, which are incorporated herein by reference.

Figure 1:
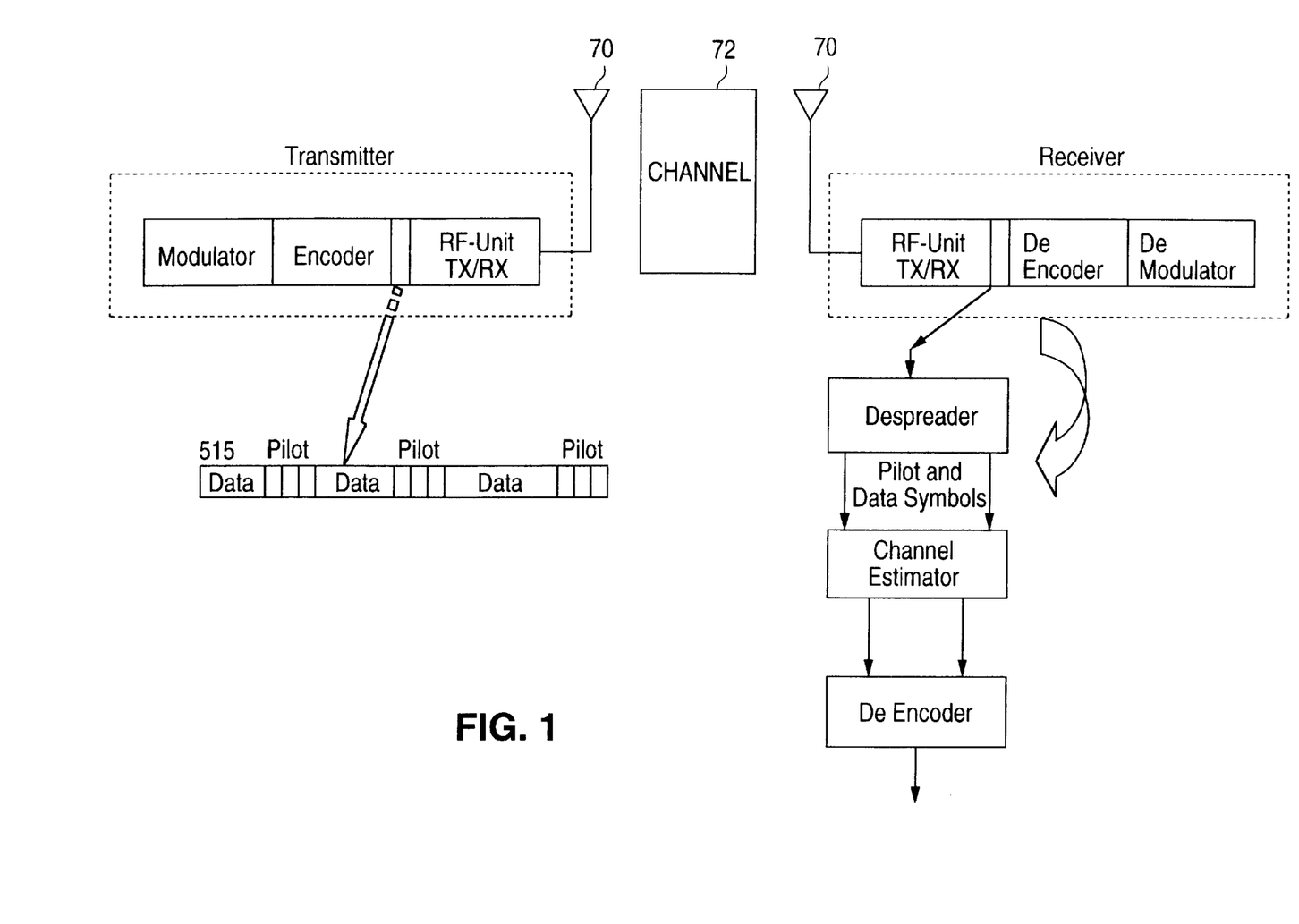
FIG. 1 schematically illustrates wireless communications systems and frame structure of time multiplexed pilot symbols for down link, available in the art.

In general, FIG. 1 illustrates a transceiver in a wireless communications system. A desired signal is subject to multipath fading (slow or fast) introduced by communication channel medium 72, which manifests itself as interference among many signal paths, each path having a different time delay. To overcome the communication channel interference and its effect on the signal constellation, pilot symbols are transmitted within the data symbols so as to estimate the fading channel characteristics and reduce signal errors. Fading may include long-term fading due to variations in terrain along the signal propagation path, as well as short-term multipath fading due to reflections from features such as buildings which cause fluctuations in received signal strength and other distortions at a receiving station. Mobile terrestrial radiotelephone communications are particularly susceptible to multipath fading because the signal pathways tend to be close to the ground. Doppler shift-induced (Rayleigh) fading is also problematic for receivers and transmitters moving at high speeds relative to one another.

As signals from diverse paths typically exhibit uncorrelated fading, they may be combined in the receiver to ameliorate fading effects. Similarly, radiotelephone communications signals may be transmitted and received using diverse polarizations and combined at the receiver to take advantage of the low correlation of fading between signals of differing polarizations. Despite the theoretical advantages of these reception techniques, however, sufficient diversity gain may not be possible because of limitations on antenna placement.

As illustrated in FIG. 1, a sequence of pilot symbols is time-multiplexed with information symbols, where the information symbols carry voice, data or other information. This technique is often referred to as pilot symbol assisted modulation. Symbol sequence 515 is communicated over the radiotelephone communications channel 72. A despreader 630 separates pilot symbol data 632 corresponding to the transmitted pilot symbols from information symbol data corresponding to the transmitted information symbols. The estimated transfer characteristic is then used in a Channel Estimator 640 to compensate estimation of the information symbols in response to distortion induced by the radio communications channel 72.

Pilot symbol assisted modulation can provide improved immunity to fading, but may have several drawbacks. In general, the error probability of symbol estimates tends to increase for those symbols which are most removed in time from the pilot symbols in the symbol sequence, contributing to the overall bit error rate for radiotelephone communications communicated over the channel. In order to reduce the bit error rate, pilot symbols may be inserted in the symbol sequence at smaller intervals to reduce the separation between the pilot symbols and to increase the accuracy of the estimated channel transfer characteristic. As pilot symbols generally have no information content, however, increasing the frequency of pilot symbols in the transmitted symbol sequence can reduce the potential information capacity of the channel, which may in turn reduce the number of channels a system can provide and the quality of each channel. Adding pilot symbols may also reduce power efficiency by wasting transmit power on non-informational symbols. While time-multiplexed pilot symbols allow down link adaptive antennas at the base station to be implemented, embedded pilot symbols are few in number and have only the same energy as the rest of the data symbols, so challenges persist Addressing the shortcomings of using time-multiplexed pilot symbols has taken on added commercial import because of the planned widespread adoption of W-CDMA as a next generation wireless communication standard, wherein time-multiplexed pilot symbols are to be used.

There are a number of available approaches to improving channel transfer characteristic estimation in embedded pilot systems. Two particularly effective available approaches include Weighted Multi-Slot Averaging (WMSA), described in "Channel Estimation Using Time Multiplexed Pilot Symbols for Coherent Rake Combining for DS-CDMA Mobile Radio" by Andoy, et al., 1997, incorporated herein by reference, and Iterative Channel Estimation (ICE), described in The Use of Iterative Channel Estimation (ICE) to Improve Link Margin in Wideband CDMA Systems", by Sclimidl, et al., 1999, incorporated herein by reference.

Figure 2:
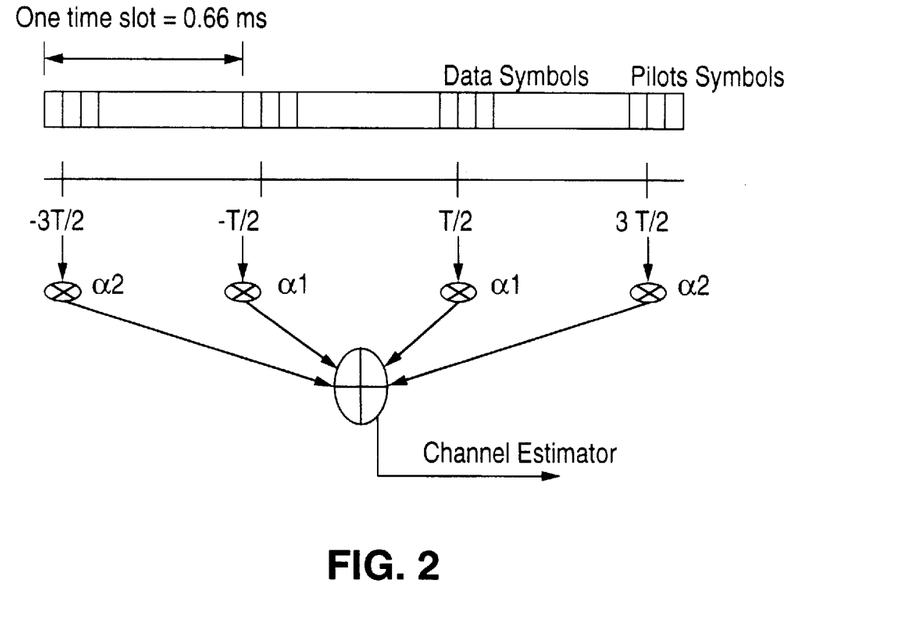
FIG. 2 is a block diagram illustrating the available Weighted Multi-Slot Averaging (WMSA) channel estimation technique.

FIG. 2 illustrates the WMSA technique and operational principals, intended to improve upon using a single pilot symbol for channel transfer characteristic estimation (instantaneous channel estimation). WCDMA downlink signals are transmitted in frames of duration 10 ms and comprise 15 time slots with duration 0.66 ms. For most data rates, there are four pilot symbols per time slot. One way to estimate the channel transfer characteristic is therefore to average the pilot symbols from multiple time slots, thereby reducing the deleterious effect of random errors and signal aberrations. Typically, 2*K sets of pilot symbols are averaged, with K sets preceding and K sets following the data symbols of the current time slot as shown in FIG. 2. The WMSA name is derived from the different weights applied to the pilot symbols depending on the distance from the time slot under analysis. If the Doppler rate were known, then the ideal coefficients could be found using a known filter. For K=2, the standard, coefficients experimentally derived to provide good performance over a wide range of Doppler frequencies are 1.0 for near symbols and 0.6 for distant symbols, as shown and well known in the art. For K=3, the optimal coefficients for near, medium and far are typically known to be 1.0, 0.8, and 0.3, respectively.

One problem not addressed by WMSA is revealed in high fading situations where there may be considerable shifts in fading from one pilot segment to another within adjacent time slots. This shortcoming of WMSA led to the development of Iterative Channel Estimation (ICE), wherein both pilot and data symbols are used to estimate channel transfer characteristics. The word "iterative" is used since an initial channel estimate is made using only the pilot symbols, and then channel estimates are refined in one or more iterations by using both pilot and data symbols.

Figure 3:
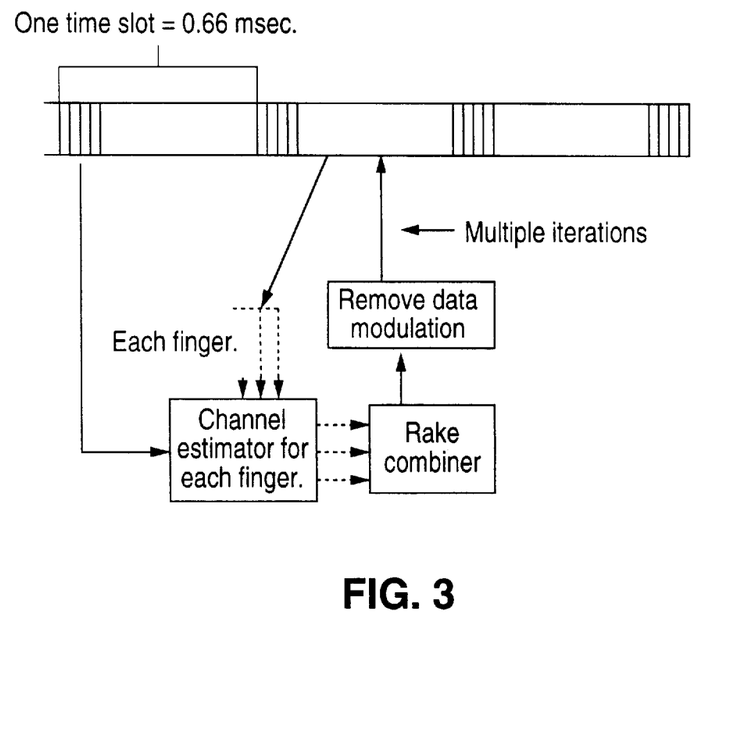
FIG. 3 is a block diagram illustrating Iterative Channel Estimation (ICE).
Figure 4:
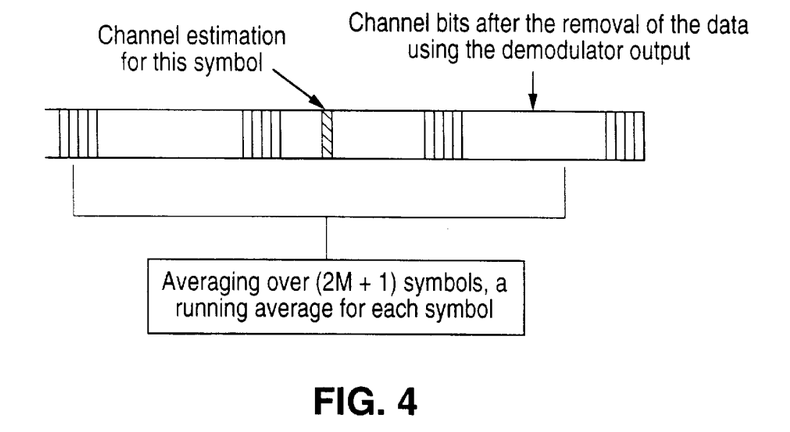
FIG. 4 further illustrates the available ICE technique.

FIG. 3 illustrates the known ICE method in block diagram format. In the first (0th) iteration, the standard WMSA channel transfer characteristic estimation method is used. The estimation derived from the 0th iteration is then used to remove the data modulation for the symbols in the shaded block. Next, as illustrated in FIG. 4, a sliding average window using both pilot and data symbols are used to make subsequent estimations. It should be noted that the channel estimate illustrated in FIG. 4 applies only to second and later iterations, and is calculated for the symbol in the center of the window. In actuality, there is a different channel estimate for each symbol. The number of symbols used in the moving average is chosen according to the approximate Doppler rate. For high Doppler rates, one time slot of symbols on either side of the chosen symbol is averaged, and for low Doppler rates two time slots of symbols are averaged. An estimate of the approximate Doppler frequency is performed before, typically using WMSA, so this represents no additional complexity for the ICE-enabled receiver.

There remain, however, significant shortcomings of both the WMSA and the ICE methods, particularly with white noise and extremely high Doppler rates. With WMSA, a random noise error effect can corrupt an entire data frame. With ICE, feedback error leads to diminished improvement over WMSA at high data rates. There is, therefore, a need in the art for an improved method of estimating channel transfer characteristics for WCDMA and other received wireless communications signals.

SUMMARY OF THE INVENTION

To address the shortcomings of the available art, the invention provides an improved method for channel estimation, by interpolating demodulation values derived from an aggregate of a plurality of instantaneous channel estimations.

It is therefore a first advantage of the invention to provide, in a radiotelephone communications system, the system including a transmitter transmitting a signal comprising a plurality of symbols grouped within time slots, a method of estimating a signal transfer characteristic at a receiver for each of the symbols, the method comprising the steps of calculating an instantaneous transfer characteristic estimation for each one of a first plurality of slots, the first plurality of slots including a first slot under analysis, combining the instantaneous channel estimations calculated for the first plurality of slots, creating a first multi-slot averaged estimate, calculating an instantaneous transfer characteristic estimation for each one of a second plurality of slots, the second plurality of slots including a second slot under analysis, combining the instantaneous channel estimations calculated for the second plurality of slots, creating a second multi-slot averaged estimate, interpolating between said first multi-slot averaged estimate and said second multi-slot averaged estimate, and calculating a transfer function estimate for a symbol within said first slot under analysis according to the interpolation of step (e).

It is another advantage of the invention to provide a method of demodulating a wireless communication signal, the signal comprising a plurality of time slots, each time slot comprising a plurality of symbols, the method comprising the steps of calculating a first multi-slot averaged estimation of the transfer characteristic needed to demodulate a first plurality of slots, the first plurality of slots including a first slot under analysis, calculating a second multi-slot averaged estimation of the transfer characteristic needed to demodulate a second plurality of slots, the second plurality of slots including a second slot under analysis, linearly interpolating between said first multi-slot averaged estimate and said second multi-slot averaged estimate, thereby calculating a transfer function estimate for each symbol within said first slot under analysis, and demodulating a symbol within said first slot under analysis, thereafter demodulating each of a plurality of symbols within said first slot under analysis, each symbol being demodulated by a distinctly calculated transfer function.

It is yet another advantage of the invention to provide a system and structure for implementing the above-described methods for estimating transfer characteristics and demodulation wireless communication symbols.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE INVENTION

Figure 5:
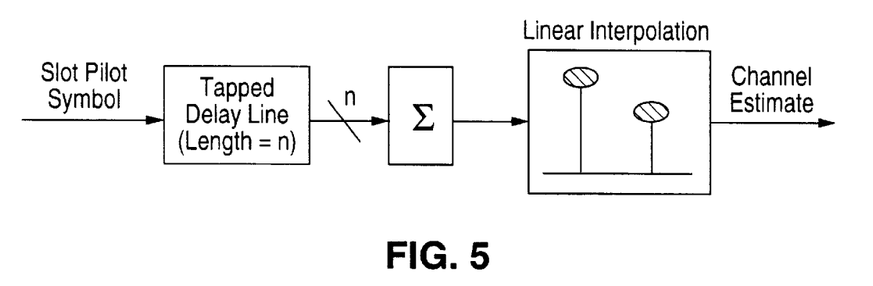
FIG. 5 is a block diagram illustrating the method and system of the invention.

Referring next to FIG. 5, there is provided a block diagram illustrating the method of the present invention. First, a plurality K (preferably three for typical speech data rates) of instantaneous channel estimations are derived from Np pilot symbols found within each of a like plurality K of adjacent slots centered around slot n−1. The instantaneous channel estimations from a plurality of slots are then combined to provide a single, multi-slot estimation value X. These steps are repeated for an adjacent and partially overlapping plurality of slots centered around slot n, providing a second multi-slot estimation value Y. A tapped delay line is used to forward instantaneous channel estimation values received earlier in time for combination with later received values. Next, the line slope between points X and Y is calculated through simple linear interpolation, providing a different transfer characteristic estimated value for each symbol contained within the slot under analysis. A third point Z (not shown) may then be calculated for slot n+1 and a linear interpolation derived between Y and Z to provide a separate estimated transfer characteristic for each symbol in slot n+1.

Since slot n cannot be analyzed until slot n+[(K−1)/2] is received and its instantaneous channel estimation calculated, K is preferably not so great as to noticeably affect real-time processing performance, and also not so small as to minimize advantageous random noise effects.

Figure 6:
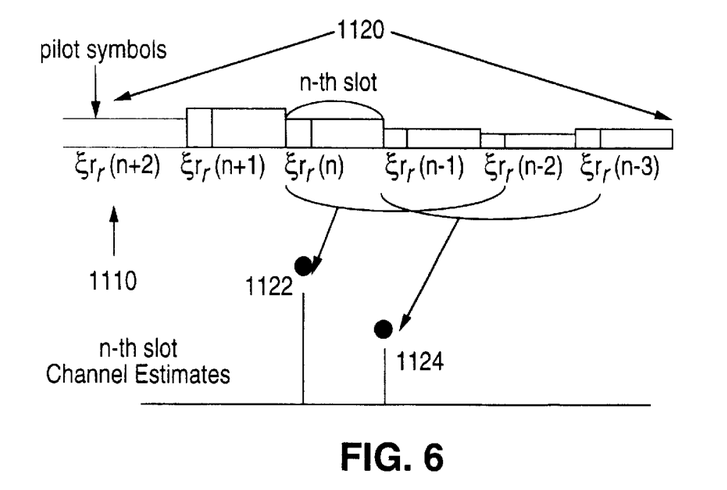
FIG. 6 graphically illustrates the multi-slot averaging and linear interpolation method and system of the invention.

Referring next to FIG. 6, there is provided a schematic illustration of the inventive multi-slot averaged linear interpolation (MALI) technique for estimating channel transfer characteristics. First, the instantaneous channel estimation is derived from the plurality Np of pilot symbols in each of a plurality of slots 1120. As known in the art, the m'th pilot symbol in the n'th slot of the l'th path can be represented as $r_l(n,m)$, and the instantaneous channel estimation, comprising the average of the Np pilot symbols in the n'th slot, can be expressed as:

$$\hat{\xi}_l(n) = \frac{1}{N_p} \sum_{m=0}^{N_p-1} r_l(n, m)$$

Next, a plurality of instantaneous channel estimations 1110 from a plurality of slots 1120, preferably three (as illustrated), are combined and the average forwarded to an adder. In the example shown, this step is first performed for slot n−1 by averaging the instantaneous estimation values in slots n−3, n−2, and n−1, providing multi-slot averaged value 1124. Another multi-slot averaged element is then derived for slot n, providing value 1122.

Multi-slot averaged values 1122 and 1124 are then linearly interpolated, providing a highly accurate estimated transfer function for the j'th symbol in the n'th slot according to the equation:

$$\tilde{\xi}_l(n, j) = j \cdot \left[ \frac{\left( \sum_{i=0}^{K-1} \hat{\xi}_l(n-i) - \sum_{i=0}^{K-1} \hat{\xi}_l(n-i-1) \right)}{num\_sym} \right] + \left( \sum_{i=0}^{K-1} \hat{\xi}_l(n-i-1) \right)$$

Figure 7A:
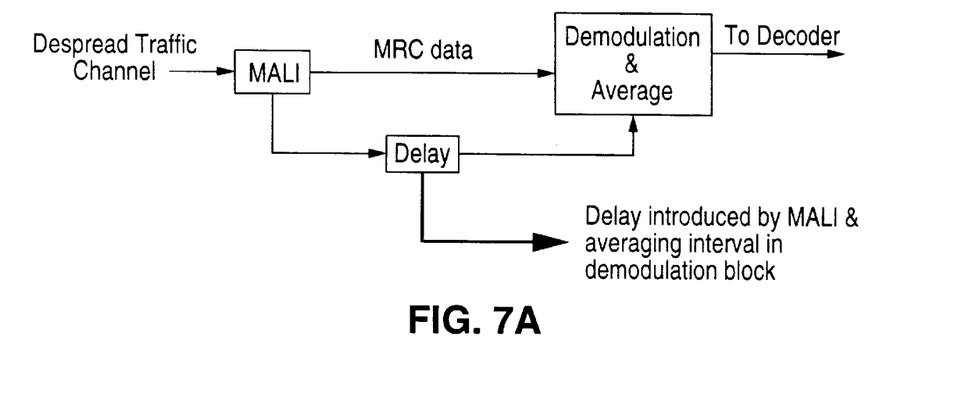
FIGS. 7A and 7B illustrate the method and system of the invention within an iterative embodiment to provide increased accuracy.
Figure 7B:
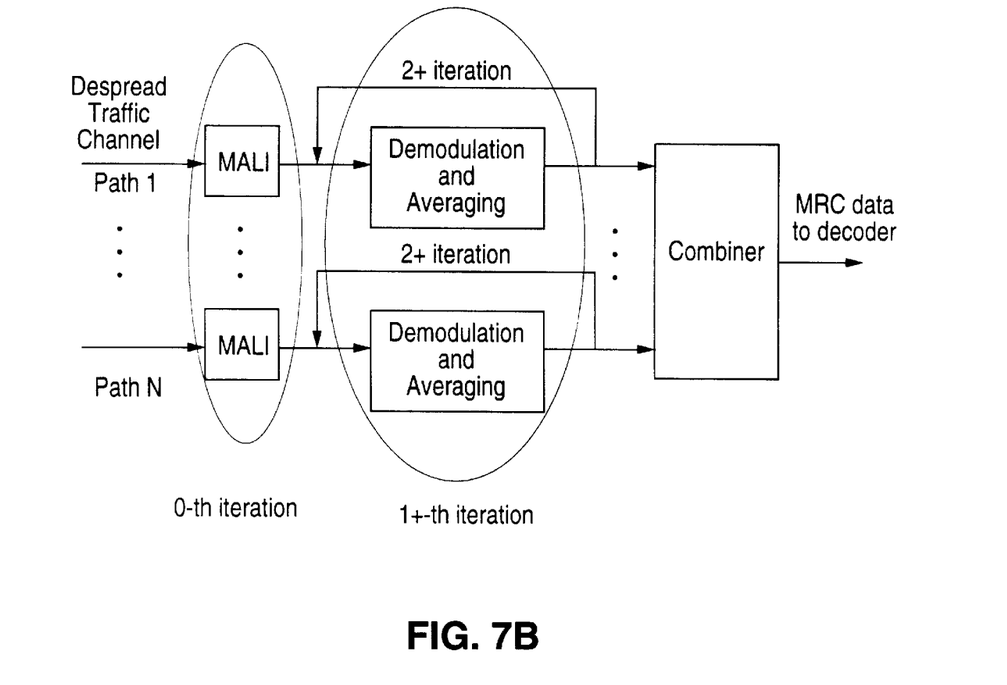

The inventive MALI (Multi-Slot Averaged Linear Interpolation) method thereby provides an effective substitute for the commonly used WMSA (Weighted Multi-Slot Averaging) technique. Moreover, the MALI method may be executed within an iterative channel estimation technique. Referring to FIG. 7A, there is illustrated the IMALI (Iterative MALI) method of the invention, implementing the above-described MALI method in an iterative fashion, as will be understood to those having ordinary skill in the relevant art and as further described below. FIG. 7B provides a second block diagram illustrating the inventive IMALI method as implemented across multiple channel paths. A Maximum Ratio Combiner ("MRC") is used before the data is forwarded to the decoder, as will be understood by those skilled in the art. The initial iteration is performed using the basic MALI method. This initial ("0'th") iteration is then used to demodulate and average later received data. Additional iterations may be introduced as desired for accuracy, although experimental data has shown only two iterations are needed to provide a good balance of accuracy and tolerable processing and feedback delay.

Figure 8:
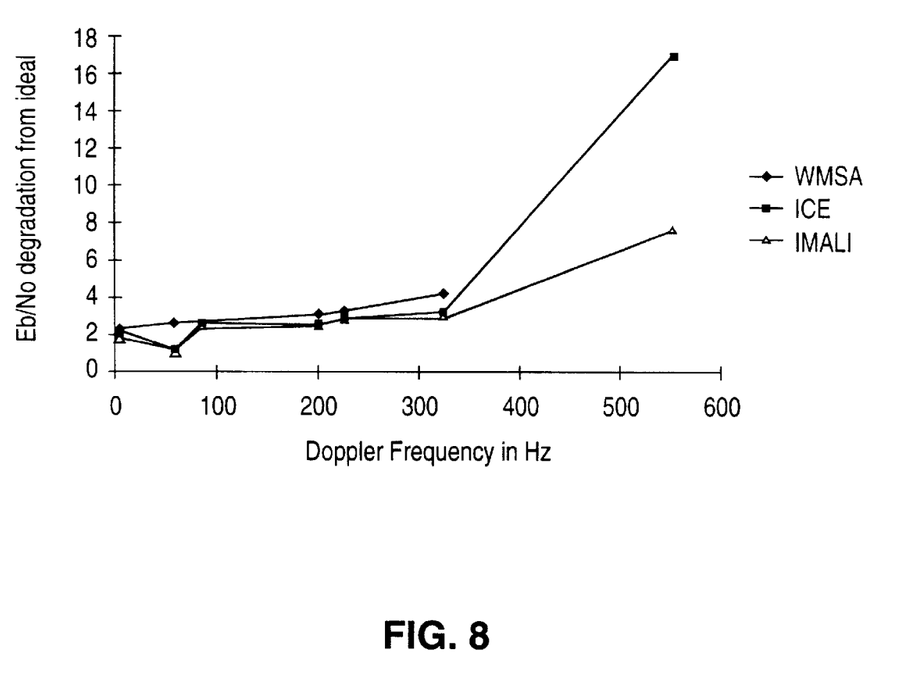
FIG. 8 graphically illustrates the efficacy of the method and system of the invention through display of the data in Table 1.

Referring next to FIG. 8, there is illustrated the efficacy of the inventive IMALI method in comparison with the available WMSA and ICE methods described above, through a graphical representation of the data provided in Table 1 below.

TABLE 1

| | Gain of IMALI over ICE and WMSA for BER = 1e − 3 | | | | | | | |
|---|---|---|---|---|---|---|---|---|
| | Eb/No required for BER 1e − 3 (dB) | | | | Degradation from Ideal (dB) | | | Gain of IMALI (dB) |
| Fading in Hz | Ideal | WMSA | ICE | IMALI | WMSA | ICE | IMALI | over WMSA | over ICE |
| 5 | 2.6 | 5.1 | 4.9 | 4.6 | 2.5 | 2.3 | 2 | 0.5 | 0.3 |
| 55.6 | 0.2 | 3 | 1.6 | 1.5 | 2.8 | 1.4 | 1.3 | 1.5 | 0.1 |
| 80 | −1.2 | 1.7 | 1.7 | 1.4 | 2.9 | 2.9 | 2.6 | 0.3 | 0.3 |
| 200 | −2 | 1.2 | 0.6 | 0.6 | 3.2 | 2.6 | 2.6 | 0.6 | 0 |
| 222 | −2.3 | 1 | 0.8 | 0.7 | 3.3 | 3.1 | 3 | 0.3 | 0.1 |
| 320 | −2.9 | 1.3 | 0.4 | 0.2 | 4.2 | 3.3 | 3.1 | 1.1 | 0.2 |
| 555 | −2.9 | N/A | 14 | 4.7 | N/A | 16.9 | 7.6 | N/A | 9.3 |

In Table 1 and FIG. 8, "Eb/No" represents the signal to noise ratio, or the ratio of energy (the power with which data is transmitted in a channel or plurality of channels) to the number of errors received, and is plotted in FIG. 8 in decibels. The Eb/No is plotted as a function of the Doppler frequency, which increases with, for example, the speed of a vehicle relative to a stationary transmitting facility such as a base station. From FIG. 8, it is apparent that the inventive MALI and IMALI methods provide considerable performance increases, particularly at higher Doppler frequencies (such as those encountered on a high-speed rail line).

The present invention therefore provides a novel method, and a system in which the method may be implemented, for estimating channel transfer characteristics using pilot symbols in a multi-slot averaged, linear interpolation. Although the present invention has been shown and described with respect to preferred embodiments, various changes and modifications lie within the spirit and scope of the claimed invention. For example, the MALI and IMALI techniques are easily adapted for use with a dedicated pilot channel instead of or in combination with embedded pilot symbols. Thus, the corresponding structures, materials, acts, and equivalents of all means or step plus function elements in the claims are intended to include any structure, material, or acts for performing the functions in combination with other elements as specifically claimed.

What is claimed is:

1. In a radiotelephone communications system, the system including a transmitter transmitting a signal comprising a plurality of symbols grouped within time slots, a method of estimating a signal transfer characteristic at a receiver for each of the symbols, the method comprising the steps of:
   a) calculating an instantaneous transfer characteristic estimation for each one of a first plurality of slots, the first plurality of slots including a first slot under analysis;
   b) combining the instantaneous channel estimations calculated for the first plurality of slots, creating a first multi-slot averaged estimate;
   c) calculating an instantaneous transfer characteristic estimation for each one of a second plurality of slots, the second plurality of slots including a second slot under analysis;
   d) combining the instantaneous channel estimations calculated for the second plurality of slots, creating a second multi-slot averaged estimate;
   e) interpolating between said first multi-slot averaged estimate and said second multi-slot averaged estimate;
   f) calculating a transfer function estimate for a symbol within said first slot under analysis according to the interpolation of step (e).

2. The method of claim 1, further comprising the step of demodulating a symbol in a manner based upon the transfer function estimate calculated in step (f).

3. The method of claim 1, further comprising the step of demodulating symbols contained within a third plurality of slots in a manner at least partially dependent upon at least one of the symbols within said first slot.

4. The method of claim 1, wherein said interpolation step comprises linear interpolation.

5. The method of claim 1, wherein said first and said second slot under analysis are adjacent slots.

6. The method of claim 1, wherein a transfer characteristic of a j'th symbol in an n'th slot is calculated in step (f) according to the equation:

$$\tilde{\xi}_l(n, j) = j \cdot \left[ \frac{\left( \sum_{i=0}^{K-1} \hat{\xi}_l(n-i) - \sum_{i=0}^{K-1} \hat{\xi}_l(n-i-1) \right)}{num\_sym} \right] + \left( \sum_{i=0}^{K-1} \hat{\xi}_l(n-i-1) \right),$$

where K equals the number of slots in the first and second pluralities of slots.

7. In a radiotelephone communications system receiver, the system including a transmitter transmitting a signal comprising a plurality of symbols grouped within time slots and a plurality of receivers receiving the transmitted signal, an apparatus for estimating a signal transfer characteristic at a receiver for each of the symbols, the apparatus comprising:
   a) means for calculating an instantaneous transfer characteristic estimation for each one of a first plurality of slots, the first plurality of slots including a first slot under analysis;
   b) means for combining the instantaneous channel estimations calculated for the first plurality of slots, creating a first multi-slot averaged estimate;
   c) means for calculating an instantaneous transfer characteristic estimation for each one of a second plurality of slots, the second plurality of slots including a second slot under analysis;
   d) means for combining the instantaneous channel estimations calculated for the second plurality of slots, creating a second multi-slot averaged estimate;
   e) means for interpolating between said first multi-slot averaged estimate and said second multi-slot averaged estimate;
   f) means for calculating a transfer function estimate for a symbol within said first slot under analysis according to the linear interpolation of step (e).

8. The apparatus of claim 7, further comprising means for demodulating a symbol in a manner based upon the transfer function calculated by said means for calculating a transfer function estimate.

9. The apparatus of claim 7, further comprising means for demodulating a symbol contained within a third plurality of slots in a manner at least partially dependent upon at least one of the symbols within said first slot.

10. The apparatus of claim 7, wherein said first and said second slot under analysis are adjacent slots.

11. The apparatus of claim 7, wherein said interpolation comprises linear interpolation.

12. The apparatus of claim 7, wherein a transfer characteristic of a j'th symbol in an n'th slot is calculated according to the equation:

$$\tilde{\xi}_l(n, j) = j \cdot \left[ \frac{\left( \sum_{i=0}^{K-1} \hat{\xi}_l(n-i) - \sum_{i=0}^{K-1} \hat{\xi}_l(n-i-1) \right)}{num\_sym} \right] + \left( \sum_{i=0}^{K-1} \hat{\xi}_l(n-i-1) \right),$$

where K equals the number of slots in the first and second pluralities of slots.

13. A method of demodulating a wireless communication signal, the signal comprising a plurality of time slots, each time slot comprising a plurality of symbols, the method comprising the steps of:
   a) calculating a first multi-slot averaged estimation of the transfer characteristic needed to demodulate a first plurality of slots, the first plurality of slots including a first slot under analysis;
   b) calculating a second multi-slot averaged estimation of the transfer characteristic needed to demodulate a second plurality of slots, the second plurality of slots including a second slot under analysis;
   c) linearly interpolating between said first multi-slot averaged estimate and said second multi-slot averaged estimate, thereby calculating a transfer function estimate for each symbol within said first slot under analysis;
   d) demodulating a symbol within said first slot under analysis;
   e) repeating step (d) for a plurality of symbols within said first slot under analysis, each symbol being demodulated by a distinct transfer function as calculated in step (c).

14. The method of claim 13, further comprising the step of demodulating symbols contained within a third plurality of slots in a manner at least partially dependent upon at least one of the symbols within said first slot.

15. The method of claim 13, wherein said first and said second slot under analysis are adjacent slots.

16. The method of claim 13, wherein a transfer characteristic of a j'th symbol in an n'th slot is calculated in step (c) according to the equation:

$$\tilde{\xi}_l(n, j) = j \cdot \left[ \frac{\left( \sum_{i=0}^{K-1} \hat{\xi}_l(n-i) - \sum_{i=0}^{K-1} \hat{\xi}_l(n-i-1) \right)}{num\_sym} \right] + \left( \sum_{i=0}^{K-1} \hat{\xi}_l(n-i-1) \right),$$

where K equals the number of slots in the first and second pluralities of slots.

* * * * *